United States Patent
Jakus et al.

(10) Patent No.: US 7,270,166 B2
(45) Date of Patent: Sep. 18, 2007

(54) FUGITIVE PATTERN ASSEMBLY AND METHOD

(75) Inventors: Richard S. Jakus, Muskegon, MI (US); Kurt R. Swartz, Spring Lake, MI (US)

(73) Assignee: Howmet Corporation, Whitehall, MI (US)

( * ) Notice: Subject to any disclaimer, the term of this patent is extended or adjusted under 35 U.S.C. 154(b) by 315 days.

(21) Appl. No.: 10/878,655

(22) Filed: Jun. 28, 2004

(65) Prior Publication Data

US 2005/0284598 A1    Dec. 29, 2005

(51) Int. Cl.
*B22C 7/00* (2006.01)
(52) U.S. Cl. .......................... 164/45; 164/35; 164/516; 164/122.1; 164/122.2
(58) Field of Classification Search .................. 164/45, 164/35, 244, 312, 235, 516, 361, 122.1, 122.2
See application file for complete search history.

(56) References Cited

U.S. PATENT DOCUMENTS

| | | | |
|---|---|---|---|
| 2,503,630 A * | 4/1950 | Norton ....................... 76/107.1 |
| 3,835,913 A | 9/1974 | Vandermark et al. ......... 164/35 |
| 4,108,931 A | 8/1978 | Ogden ........................ 264/37 |
| 4,109,699 A | 8/1978 | Miller et al. ................. 164/244 |
| 4,676,294 A | 6/1987 | Berger ......................... 164/35 |
| 4,972,897 A | 11/1990 | Thomas ........................ 164/35 |
| 4,981,167 A | 1/1991 | Anderson ..................... 164/35 |
| 5,297,609 A | 3/1994 | Cook ............................ 164/35 |
| 5,303,762 A | 4/1994 | Chandley ..................... 164/63 |
| 5,465,780 A * | 11/1995 | Muntner et al. ............. 164/516 |
| 5,503,218 A | 4/1996 | Campion et al. ............ 164/516 |
| 5,651,409 A | 7/1997 | Sheehan ....................... 164/412 |
| 5,735,336 A | 4/1998 | Oti ............................... 164/516 |
| 5,921,309 A | 7/1999 | Nishida et al. ................ 164/35 |
| 6,129,138 A * | 10/2000 | Gartland ........................ 164/516 |
| 6,497,272 B1 | 12/2002 | Maslen ......................... 164/516 |
| 6,505,672 B2 | 1/2003 | Mertins ......................... 164/34 |
| 6,505,678 B2 | 1/2003 | Mertins ......................... 164/516 |
| 6,789,604 B2 * | 9/2004 | Mertins ......................... 164/235 |
| 2002/0124987 A1 | 9/2002 | Soderstrom et al. ......... 164/136 |
| 2003/0075298 A1 | 4/2003 | Mertins | |
| 2003/0098136 A1 | 5/2003 | Ludwig et al. ................ 164/35 |

FOREIGN PATENT DOCUMENTS

| | | | |
|---|---|---|---|
| JP | 60 083739 | 5/1985 | |
| JP | 62 064450 | 3/1987 | |
| JP | 63 194839 | * 8/1988 | .................. 164/45 |
| JP | 02 055639 | 2/1990 | |
| JP | 11 244995 | 9/1999 | |

OTHER PUBLICATIONS

"MIM 'marries' metals", Metal Powder report, MPR Publishing Services, Shrewsbury, GB, vol. 57, No. 3, Mar. 2002, pp. 38-42.

* cited by examiner

*Primary Examiner*—Kevin Kerns
*Assistant Examiner*—I.-H. Lin

(57) ABSTRACT

A fugitive pattern assembly is made by preforming one or more fugitive patterns of an article to be cast, placing the preformed patterns in an injection die, and injecting fluid gating material into the die to form gating connected to the patterns. The fugitive patterns are disposed in end-to-end and/or side-by-side relation and are interconnected by the gating.

9 Claims, 8 Drawing Sheets

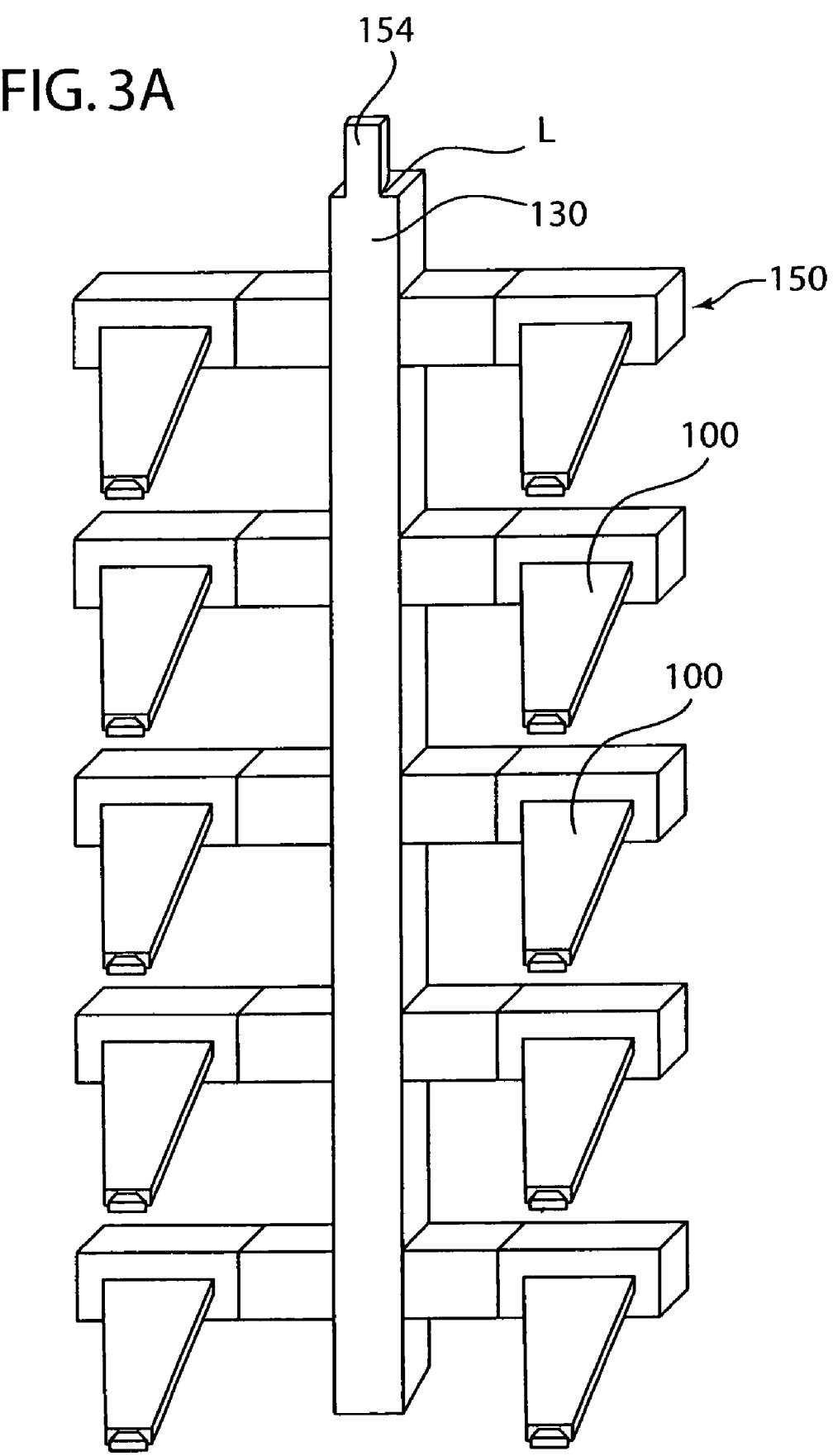

FUGITIVE PATTERN ASSEMBLY AND METHOD

FIELD OF THE INVENTION

The present invention relates to a fugitive pattern assembly for use making a shell mold for the investment casting of metals and alloys as well as a method and injection die for making a fugitive pattern assembly.

BACKGROUND OF THE INVENTION

In the well known "lost wax" process of investment casting, a fugitive or disposable wax pattern is made by injection molding melted wax or other fluid fugitive material in a die corresponding to the configuration of the article to be cast. A plurality of such molded patterns are joined to a common gating system made of wax or other fugitive material, and/or to one another by gating, to provide a pattern assembly that can be invested in a ceramic shell mold. For example, the gating system typically includes a sprue or runner to which one or more patterns are connected and a pour cup connected to the sprue or runner. Multiple fugitive patterns may be joined by gating in end-to-end or other arrangement to one another before being joined to the gating system. The actual configuration of the pattern assembly varies depending on the type of cast article to be made in the shell mold; for example, whether the cast article is to be an equiaxed grain, directionally solidified columnar grain, or single crystal casting.

Typically, as a result of complexity of the pattern assembly and/or cost of injection dies, the patterns are joined to the gating system and/or to one another manually using labor-intensive techniques in a manner that requires a joint that is waterproof and structurally sound to prevent the patterns from separating from the gating system as the shell mold is built up on the pattern assembly. When the patterns and gating system are made of wax, the patterns are joined to the gating system by wax welding processes well known in the art to produce a wax weld joint between the patterns and the gating system. However, manually assembled fugitive pattern assemblies can exhibit unwanted variability in pattern locations and joint quality from one pattern to the next and from one pattern assembly to the next.

The pattern assembly thus produced is invested in a ceramic shell mold by repeatedly dipping the pattern in a ceramic slurry, draining excess slurry, stuccoing with coarse ceramic particles or stucco, and air drying until a desired thickness of a ceramic shell mold is built-up on the pattern assembly. The pattern assembly then is removed from the green shell mold typically by heating the shell mold to melt out the pattern assembly, leaving a ceramic shell mold which then is fired at elevated temperature to develop appropriate mold strength for casting a molten metal or alloy.

An object of the invention is to provide an improved method of making a fugitive pattern assembly, as well as the pattern assembly made by the method, useful in making shell molds for the lost wax precision investment casting process wherein the need for manual joining of the fugitive patterns to one another and/or to a gating system is reduced.

SUMMARY OF THE INVENTION

The present invention provides in one embodiment a method of making a fugitive pattern assembly involving preforming a fugitive pattern of an article to be cast, placing the preformed pattern in an injection die, and injecting fluid gating material into the die to form in-situ gating connected to the pattern. Typically, a plurality of fugitive patterns are placed in the die and the fluid gating material is injected into the die to form gating that interconnects the patterns.

In a particular embodiment of the invention, the fugitive patterns are disposed in end-to-end relation and are interconnected by the gating extending between end-to-end regions of adjacent patterns.

In another particular embodiment of the invention, the fugitive patterns are disposed in side-by-side relation and are interconnected by gating extending between side-by-side end regions of adjacent patterns.

In practicing a particular method embodiment of the invention, the pattern is placed in a pattern-receiving cavity of the die. The pattern-receiving cavity communicates to a gating cavity of the die. The fluid gating material is injected into the gating cavity to form the gating in-situ in the die and connected to the pattern. The pattern preferably includes an extension that resides in the gating cavity of the die when the pattern is received in the pattern-receiving cavity such that the extension is captured in the in-situ formed gating. The pattern extension includes a mechanical joint-forming surface, such as a dovetail joint-forming surface, to provide a mechanical joint between the pattern and gating.

The invention also provides a fugitive pattern assembly including a fugitive pattern of an article to be cast and gating connected to the pattern by injecting a fluid gating material as described above. The pattern assembly can include multiple fugitive patterns that are disposed in end-to-end relation or side-by-side relation and are interconnected by the injected gating.

In an illustrative embodiment, the patterns each have an airfoil region with a root region and a tip region wherein end-to-end root regions of adjacent patterns are interconnected by the gating, end-to-end tip regions of adjacent patterns are interconnected by the gating, or the root region of one pattern is interconnected to the tip region of an adjacent pattern by the gating. In another illustrative embodiment, the patterns each have an airfoil with a root and a tip wherein end-to-end roots of adjacent patterns are interconnected by the gating and/or side-by-side tips of adjacent patterns are interconnected by the gating.

The invention further provides an injection molding die that includes a pattern-receiving cavity and a gating cavity communicated to the pattern-receiving cavity for receiving fluid gating material to form gating in-situ and connected to a preformed pattern received in the pattern-receiving cavity. The die typically includes an injection runner connected to the gating cavity and through which fluid gating material is introduced into the gating cavity.

Advantages of the invention will become more readily apparent from the following detailed description.

DESCRIPTION OF THE DRAWINGS

FIG. 3A is an elevational view of the pattern assembly produced using the gating die of FIG. 3.

DETAILED DESCRIPTION OF THE INVENTION

The present invention provides a method of making a fugitive pattern assembly for use in the lost wax investment casting process employed in the high volume commercial production of metal and alloy cast articles wherein a refractory (e.g. ceramic) shell mold is formed on the pattern assembly to replicate its shape and the pattern assembly is subsequently removed to leave an empty refractory shell mold for casting of the metal or alloy. The invention is described below for purposes of illustration, and not limitation, in relation to a fugitive pattern assembly for use in making a shell mold for investment casting of an airfoil, such as a gas turbine engine blade or vane, although the invention is not limited in this regard and can be practiced to make a pattern assembly for use in making a shell mold for the investment casting of any article. The invention is especially useful in making a pattern assembly having a plurality of wax patterns joined to a wax gating system, although the invention can be practiced using any fugitive pattern material, such as conventional pattern wax, solid or foam plastic (e.g. polymeric foam such as polyurethane foam), polymeric pattern materials, and others.

Figure 1:
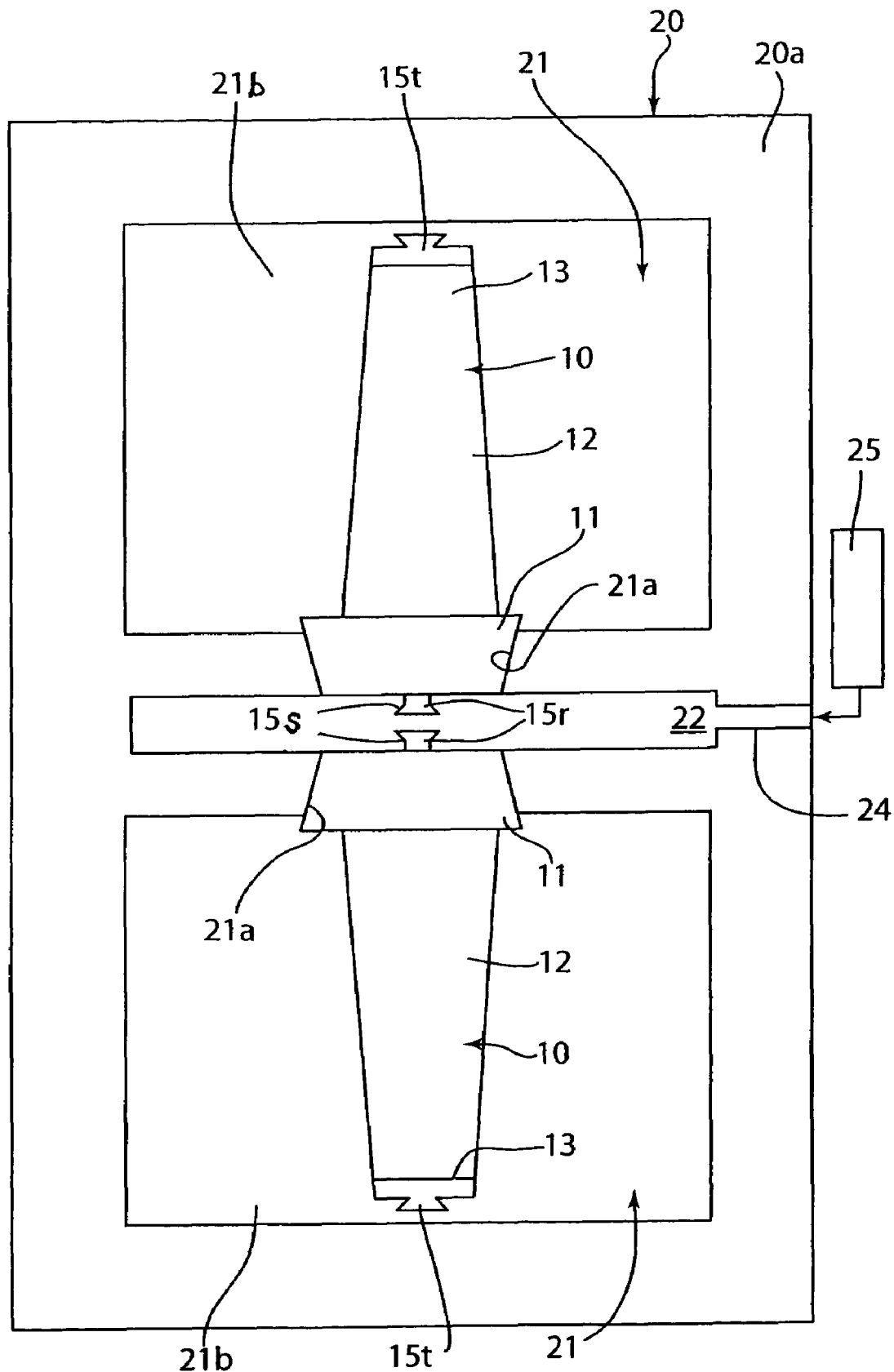
FIG. 1 is a plan view of a lower half of a gating injection die pursuant to an embodiment of the invention wherein airfoil patterns are joined in end-to-end relation with root extensions of the patterns joined together by the in-situ injected gating.

FIG. 1 schematically shows an illustrative embodiment of the invention for making a pattern assembly wherein preformed fugitive airfoil patterns 10 are to be joined in end-to-end (root-to-root) relation. Each airfoil pattern comprises a root region 11, an airfoil region 12, and a tip region 13. Such airfoil patterns 10 are used in making a shell mold for the investment casting of gas turbine engine blades for example.

The airfoil patterns 10 can be injection molded in a conventional pattern die (not shown) by injecting a fluid fugitive pattern material, such as molten wax, into a suitably configured cavity in the pattern die. For purposes of illustration and not limitation, the fugitive patterns can be made using screw type injection molding machines, molten wax pot injection presses, and other injection and/or press machines wherein a molten pattern material is introduced preferably under pressure into a mold cavity. Injection molded patterns are well known and described for example in U.S. Pat. Nos. 6,497,272 and 6,505,672 which are incorporated herein by reference. Those skilled in the art will appreciate that the invention can be practiced using one or more fugitive patterns 10 that is/are formed using any suitable pattern making process and apparatus and that the invention is not limited to injection molding of the patterns.

Pursuant to an aspect of the invention, the preformed patterns 10 are shown positioned in a gating die 20 in order for gating to be formed in-situ between the root regions 11 of the end-to-end patterns. A lower half 20a of the gating die 20 is shown in FIG. 1. The upper half of the gating die 20 typically includes similar complementary die features that mate or cooperate with those described below, FIG. 1B. For example, the gating die half 20a includes portions of cavities 21 and 22 and runner passage 24 that are configured to receive a respective preformed pattern 10. Although two patterns 10 are shown in gating die 20 in FIG. 1 for purposes of illustration, typically in practice of the invention additional fugitive patterns similar to patterns 10 would be disposed in the gating die, for example, with each pattern received in respective cavities like cavities 21, which could located on the lefthand and/or righthand sides of the die 20 in FIG. 1 in a manner to provide a die cavity arrangement similar to that shown in FIG. 3 where a common gating cavity 22 resides between the pattern-receiving cavities 21. Alternately or in addition, additional die cavities 21, 22 could be disposed on opposite sides of FIG. 1 out of the plane of the drawing on the front and back sides thereof. For example, the cavity 22 could extend normal to the plane of the drawing out of the front and/or back of the plane with cavities 21 extending from the cavity 22 along its length into and out of the plane of the drawing.

Each cavity 21 includes a first root-receiving cavity 21a adapted to receive the root region 11 with root extension 15r and a second cavity 21b adapted to receive the airfoil 12 and the tip 13 with tip extension 15t. The root region 11 of each pattern 10 is received in close tolerance fit in the root-receiving cavity 21a so to hold the pattern in desired position in the die and to position root extension 15r in gating cavity 22 of the gating die 20.

The second cavities 21b can have any suitable shape. For example, the cavities 21b may have a shape that is complementary to that of the pattern airfoil and tip regions 10 with clearance to permit each pattern to be received in a respective cavity 21b. Alternatively, the second cavities 21b can have a more generic shape as shown adapted to receive and accommodate patterns having different airfoil and tip regions.

The gating die half 20a includes portions of an injection runner passage 24 communicated to the gating cavity 22 and through which fluid gating material, such as molten wax, expanding foam plastic or other gating material, is introduced into the gating cavity 22 from a source 25, which for purposes of illustration and not limitation may comprise a source on the injection machine, such as a tank or reservoir of molten gating material.

The extension 15r on each root region 11 of each fugitive pattern 10 resides in the gating cavity 22 of the die 20 when the root region 11 of the respective pattern 10 is received in the respective first root-receiving cavity 21a. The root extension 15r includes a mechanical joint-forming surface 15s, which is shown as a dovetail joint-forming surface in FIG. 1.

Figure 1A:
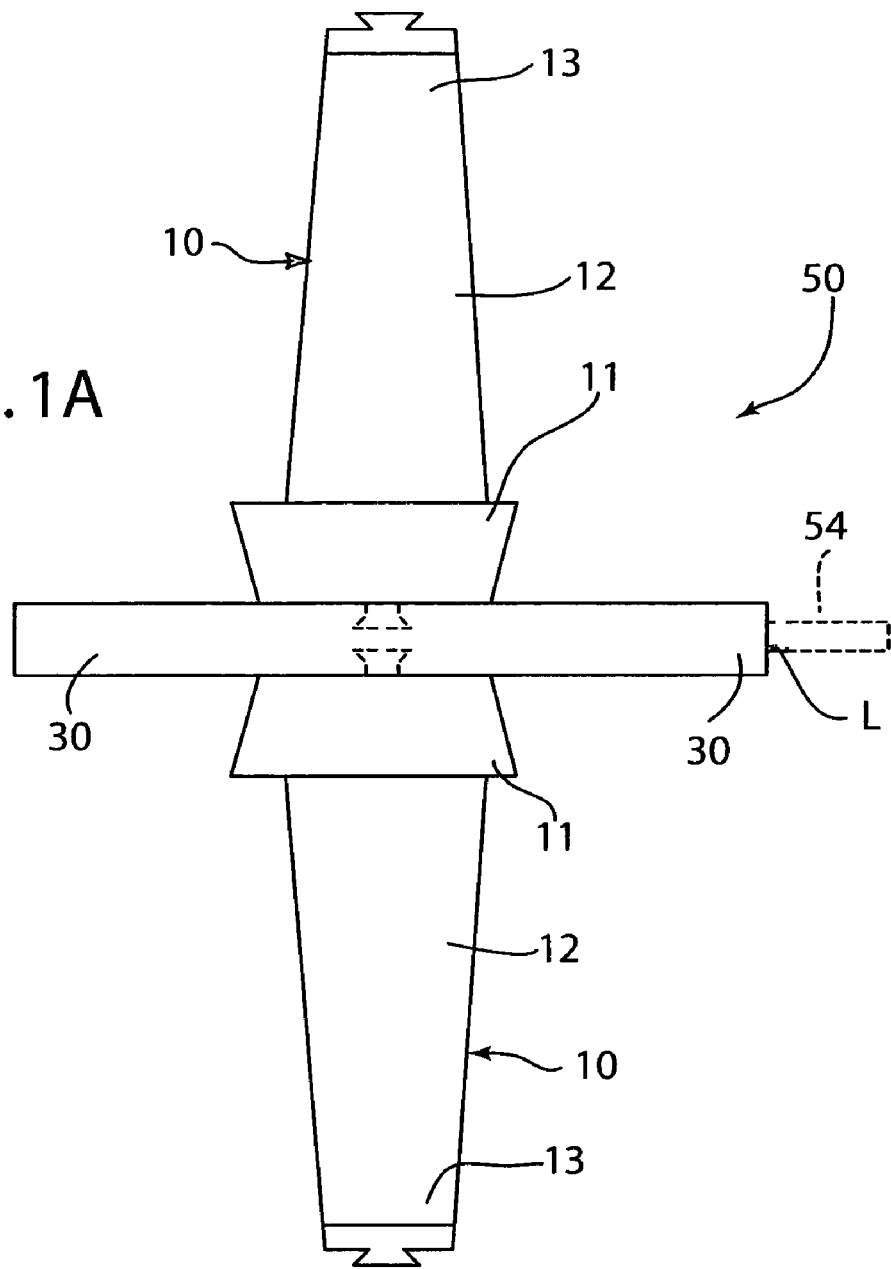
FIG. 1A is an elevational view of the pattern assembly produced using the gating die of FIG. 1.
Figure 1B:
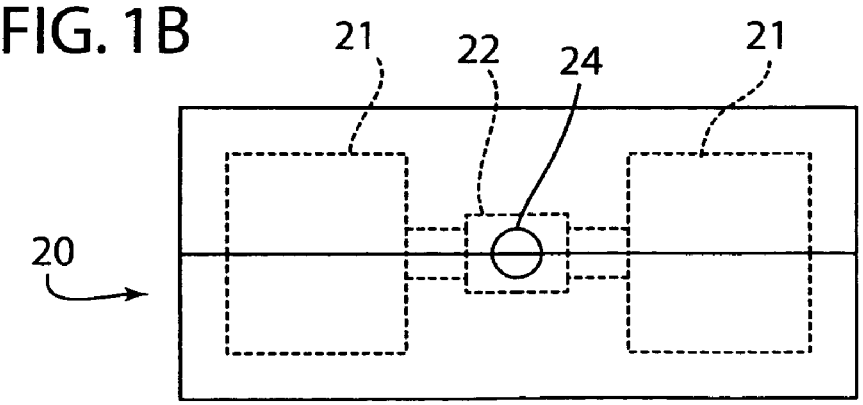
FIG. 1B is a schematic side elevaton of lower and upper die halves of the gating die.

In practicing a method aspect of the invention, the preformed fugitive patterns 10 of an article to be cast are placed in the injection die 20 and the fluid gating material, such as molten wax, is injected into the gating cavity 22 about and between the extensions 15r via the runner passage 24 to form in-situ in the die 20 the gating 30 interconnecting the fugitive patterns 10 in end-to-end (root-to-root) relation, FIG. 1A. The gating 30 is solidified about and between the extensions 15r in a manner to mechanically lock each pattern 10 to the gating 30 by virtue of the wax bonding and mechanical joint therebetween. The fluid gating material may comprise the same or a different material from that of the patterns 10. For example, the patterns 10 may comprise a particular wax blend while the gating 30 may comprise the same or a different wax blend.

In the above-described way, an embodiment of the invention can be practiced to make a pattern assembly 50, FIG. 1A, that comprises one or more preformed fugitive patterns 10 of an article to be cast and gating 30 connected to and interconnecting the patterns 10 in end-to-end relation. The pattern assembly 50 (called a gang by the inventors) of FIG. 1A is removed from the opened gating die 20 and then is joined to a conventional sprue (not shown) and pour cup (not shown) to provide a final pattern assembly for making a shell mold by the lost wax shell mold building process after the runner 54 (formed by solidified wax in runner passage 24) is removed from the pattern assembly 50 at location L. Fugitive patterns joined by a sprue or runner to a pour cup are shown in U.S. Pat. Nos. 4,108,931; 6,497,272 which are incorporated herein by reference.

Although FIGS. 1 and 1A illustrate interconnecting the fugitive patterns 10 with their root regions 11 in end-to-end relation, the invention is not so limited and can be used to interconnect the patterns 10 with gating in other arrangements. For example, referring to FIGS. 2 and 2A, fugitive patterns 10' are shown interconnected to one another in a manner that the extension 15r' of the root region 11' of one pattern 10' is interconnected to the extension 15t' of the tip region 13' of an adjacent pattern 10' by the gating 30' injected in-situ in the gating cavity 22' of gating die 20' (lower die half 20a' shown). Moreover, the extension 15t' of the tip region 13' of one pattern 10' is connected to a preformed fugitive (e.g. wax) pigtail crystal or grain starter and selector member 35' by gating 31' injected in-situ in gating cavity 23' provided in die 20'. The extension 15r' of the root region 11' of the other pattern 10' is captured in a gating block 32' injected in-situ in gating cavity 27' for the purpose of producing an attachment that can be used to connect with gating and/or support structure for combining multiple pattern assemblies 50' into a mold setup to make a casting mold. The feature formed by cavity 27' can be of various configurations determined by the requirements for attaching assembly 50' to a mold setup.

Figure 2:
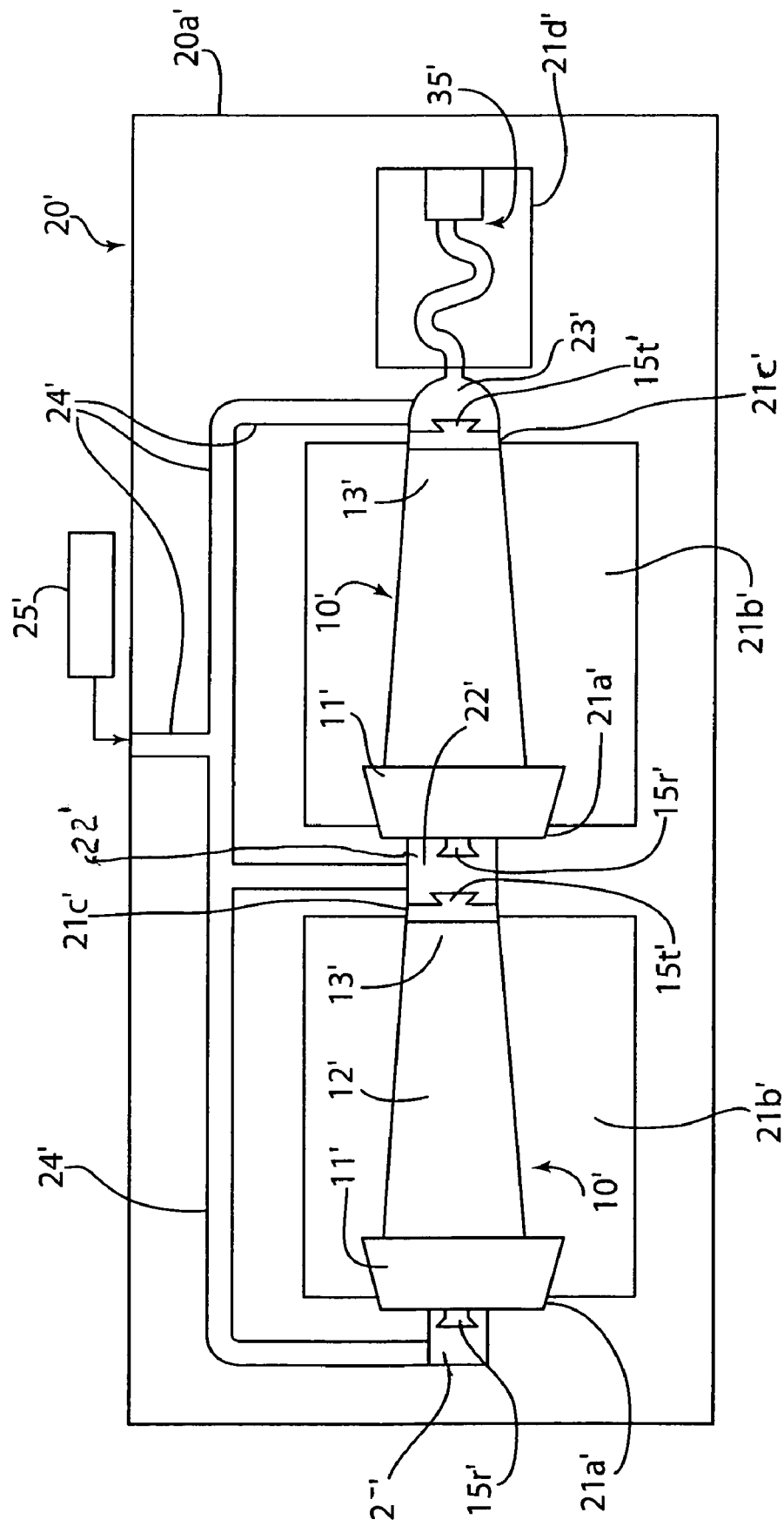
FIG. 2 is a plan view of a lower half of a gating injection die pursuant to another embodiment of the invention wherein airfoil patterns are joined in end-to-end relation with a root extension of one pattern interconnected to a tip extension of an adjacent pattern by in-situ injected gating.

To this end, in FIG. 2, the root region 11' of each pattern 10' is received in a root-receiving cavity 21a' and the tip extension 15t' is received in a tip-receiving cavity 21c' with the airfoil region residing in respective cavity 21b'. The adjacent extensions 15t', 15r' of the tip and root regions are thereby received in the common gating cavity 22'. The extension 15r' of the opposite root region 11' (left hand root region of FIG. 2) is received in gating cavity 25'. The extension 15t' of the opposite tip region 13' (right hand tip region of FIG. 2) is received in gating cavity 23' as shown in FIG. 2.

The pigtail crystal or grain starter and selector member 35' is received in fourth cavity 21d' adjacent the gating cavity 23' of the die 20'. The preformed fugitive pigtail crystal or grain starter and selector member 35' is included on the pattern assembly of FIG. 2A in order to make a shell mold for casting single crystal articles of metal or alloy as is well known. The preformed fugitive pigtail crystal or grain starter and selector member 35' is made by injecting molten wax or other fugitive material in a suitable die cavity.

Figure 2A:
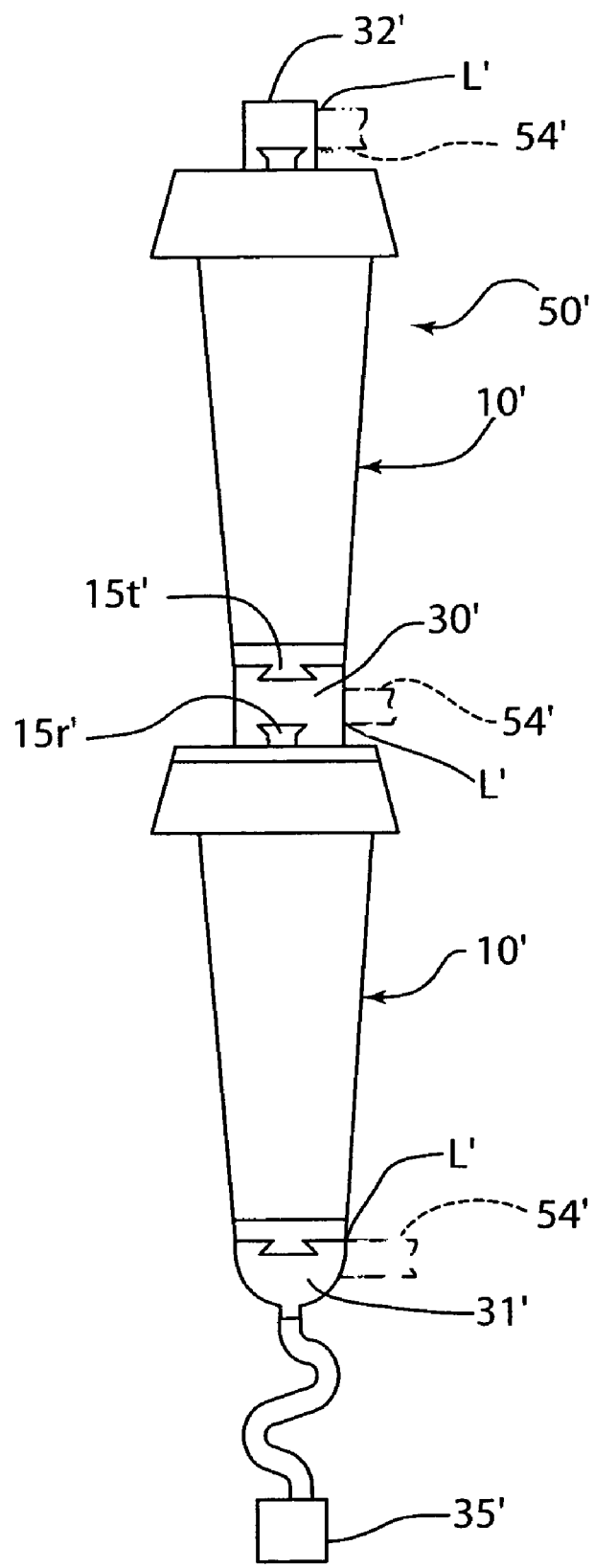
FIG. 2A is an elevational view of the pattern assembly produced using the gating die of FIG. 2.

In practicing a method aspect of this embodiment of the invention, the preformed fugitive patterns 10' of an article to be cast and the pigtail crystal or grain starter and selector member 35' are placed in the injection die 20' and the fluid gating material, such as molten wax, is injected from source 25' into the gating cavities 22', 23', 27' via the runner passages 24' shown to form in-situ in the die 20' the gating 30', 31', 32', FIG. 2A, of pattern assembly 50'. The gating 30' is solidified about and between the extensions 15r', 15t' in gating cavity 22' in a manner to mechanically lock each pattern 10' to the gating by virtue of the wax bonding and mechanical joint therebetween. Moreover, the gating 31' is solidified about the extension 15t' in gating cavity 23' in a manner to mechanically lock the pattern 10' to the pigtail crystal or grain starter and selector member 35' by virtue of the wax bonding and mechanical joint therebetween.

The pattern assembly 50' of FIG. 2A is removed from the opened gating die 20' and joined to the pour cup or other structural member by attaching preformed gating pieces or structural pieces typically to the gating 32' to provide a final pattern assembly for making a shell mold by the lost wax shell mold building process after the runner 54' (formed by solidified wax in runner passage 24') is removed from the pattern assembly 50' at locations L'.

Figure 3:
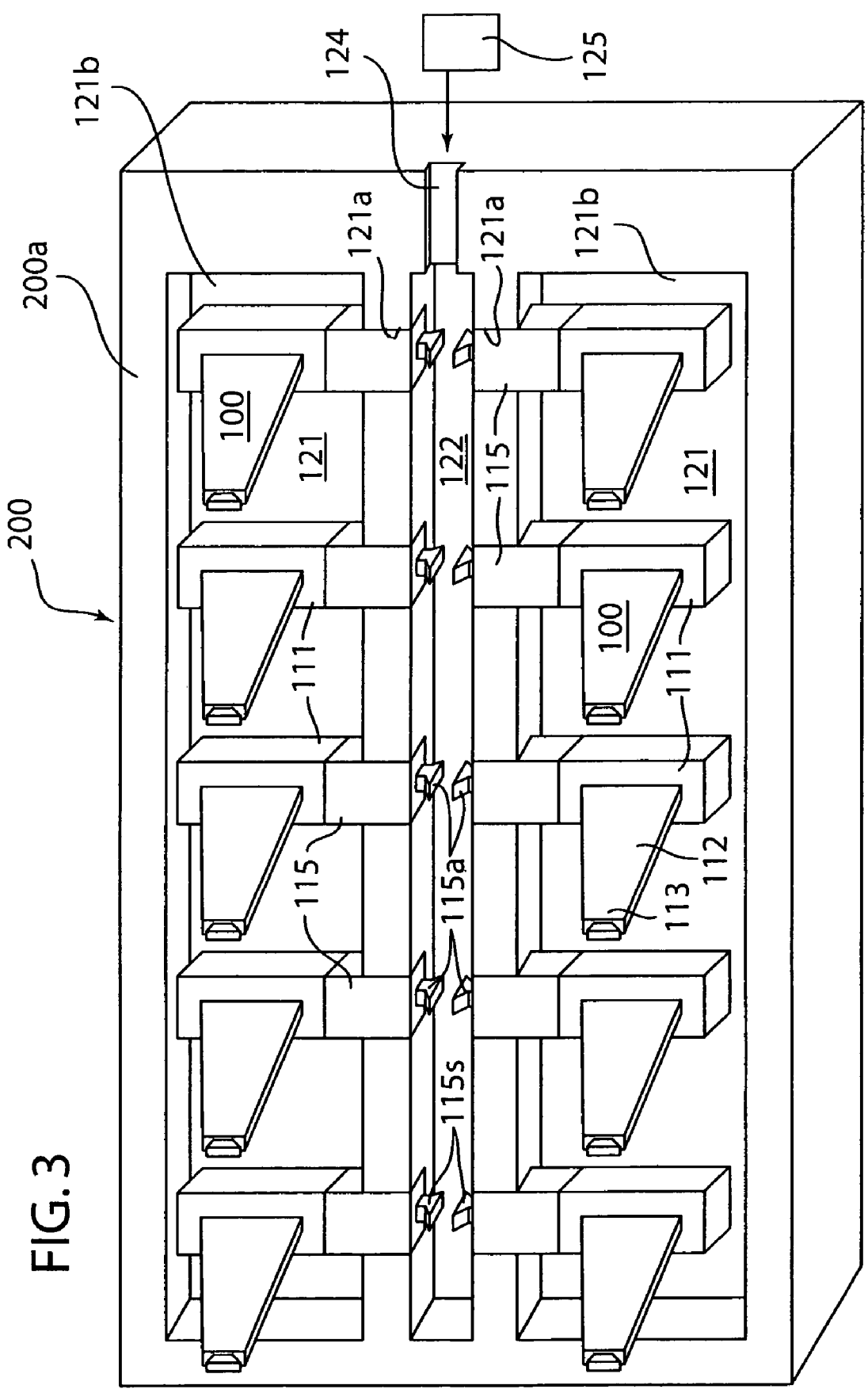
FIG. 3 is a plan view of a lower half of a gating injection die pursuant to a further embodiment of the invention wherein airfoil patterns are joined in side-by-side relation with the root extensions of the patterns joined by a common gating runner.

In practicing another method aspect of the invention illustrated in FIG. 3, preformed fugitive patterns 100 of an article to be cast are placed in the injection die 200 (lower half 200a shown) and the fluid gating material, such as molten wax, is injected from source 125 into the gating cavity 122 via the runner passage 124 to form in-situ in the die 200 the gating 130 interconnecting the fugitive patterns 100 in side-by-side relation, FIG. 3A.

Pursuant to this aspect of the invention, the preformed patterns 100 are shown positioned in a gating die 200 in order for gating to be formed in-situ between extensions 115 on the root regions 111 of the side-by-side patterns. A lower half 200a of the gating die 200 is shown in FIG. 3. The upper half of the gating die 200 typically includes similar complementary die features (e.g. cavities 121, 122, and runner passage 124) that mate or cooperate with those described below.

For example, the gating die half 200a includes portions of first and second pattern-receiving cavities 121 that are configured to receive the preformed patterns 100.

Each cavity 121 includes a first root extension-receiving cavity 121a adapted to receive the primary extensions 115 of the root regions 111 of each pattern and a second cavity 121b adapted to receive the root region 111, airfoil region 112, and tip region 113 of the pattern 100 with clearance. The primary extension region 115 of each pattern 100 is received in close tolerance fit in the extension-receiving cavity 121a so to hold the pattern in desired position in the die and to position a secondary root extension 115a in gating cavity 122 of the gating die 200. The cavities 121b can have any suitable shape as described above for cavity 21b.

The gating die half 200a includes portions of injection runner passage 124 communicated to the gating cavity 122 and through which fluid gating material, such as molten wax or other gating material, is introduced into the gating cavity 122 from a source 125 of the type described above.

The secondary root extension 115a on each root region 111 of each fugitive pattern 100 resides in the gating cavity 122 of the die 120 when the primary extension region 115 of the respective pattern 100 is received in the respective root extension-receiving cavity 121a. The secondary root extension 115a has a mechanical joint-forming surface 115s, which is shown as a dovetail joint-forming surface in FIG. 3.

In practicing a method aspect of the invention, the preformed fugitive patterns 100 of an article to be cast are placed in the injection die 200 and the fluid gating material, such as molten wax, is injected into the gating cavity 122 via the runner passage 124 to form in-situ in the die 200 the gating 130 interconnecting the fugitive patterns 100 in side-by-side relation, FIG. 3A. The gating 130 is solidified about and between the extensions 115a in a manner to mechanically lock each pattern 100 to the gating 130 by virtue of the wax bonding and mechanical joint therebetween.

In this way, an embodiment of the invention can be practiced to make a pattern assembly 150, FIG. 3A, that comprises one or more preformed fugitive patterns 100 of an article to be cast and gating 130 connected to and interconnecting the patterns 100 in side-by-side relation. The pattern assembly 150 of FIG. 3A is removed from the opened gating die and then is joined to a runner bar that connects other pattern assemblies 150 and a pour cup to provide a final pattern assembly for making a shell mold by the lost wax shell mold building process after the runner 154 (formed by solidified wax in runner passage 124) is removed from the pattern assembly 150 at location L.

Figure 4:
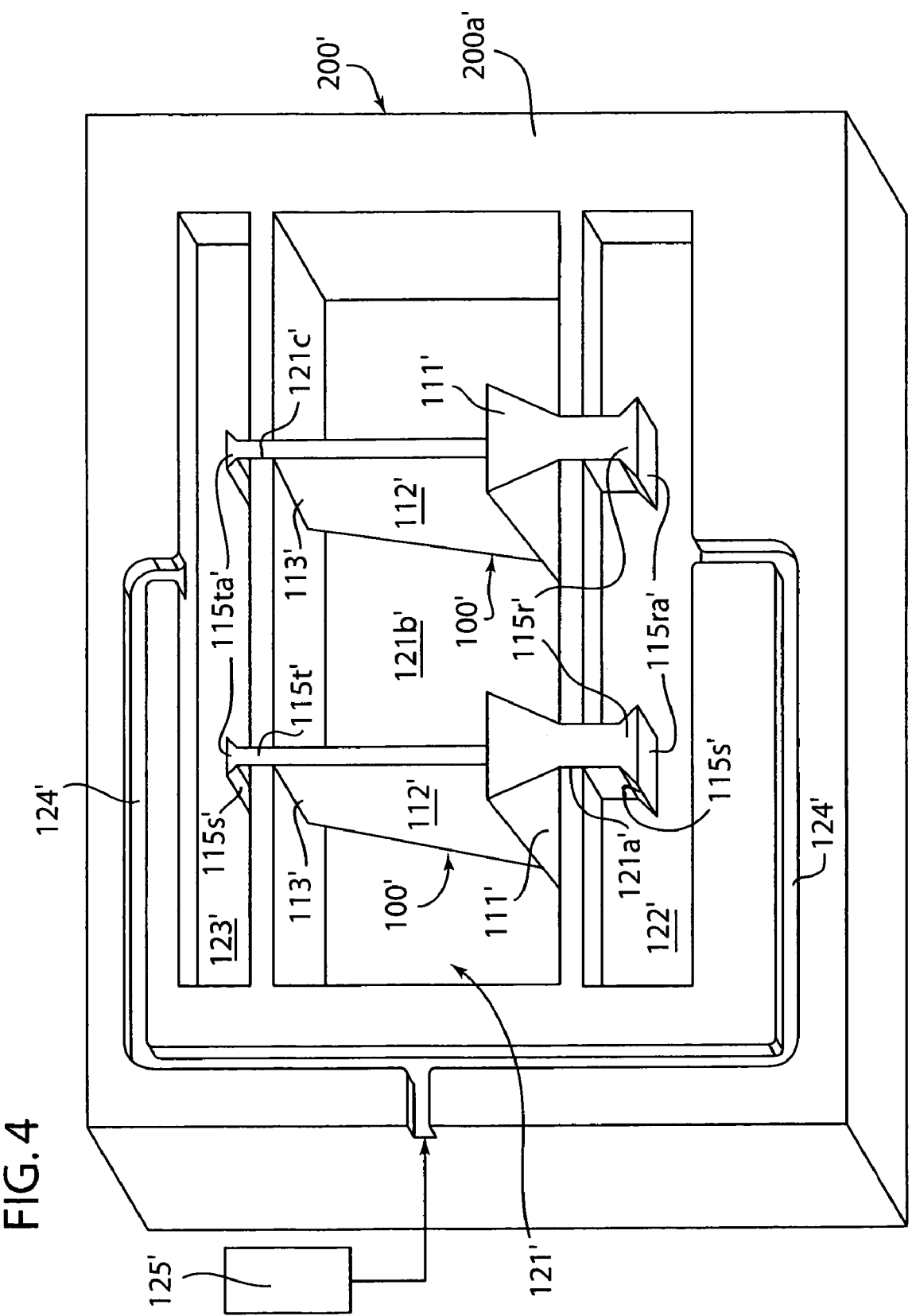
FIG. 4 is a plan view of a lower half of a gating injection die pursuant to a still further embodiment of the invention wherein airfoil patterns are joined in side-by-side relation with root extensions of the patterns joined by a first common in-situ injected gating and with adjacent tip extensions of the patterns joined by a second common in-situ injected gating.
Figure 4A:
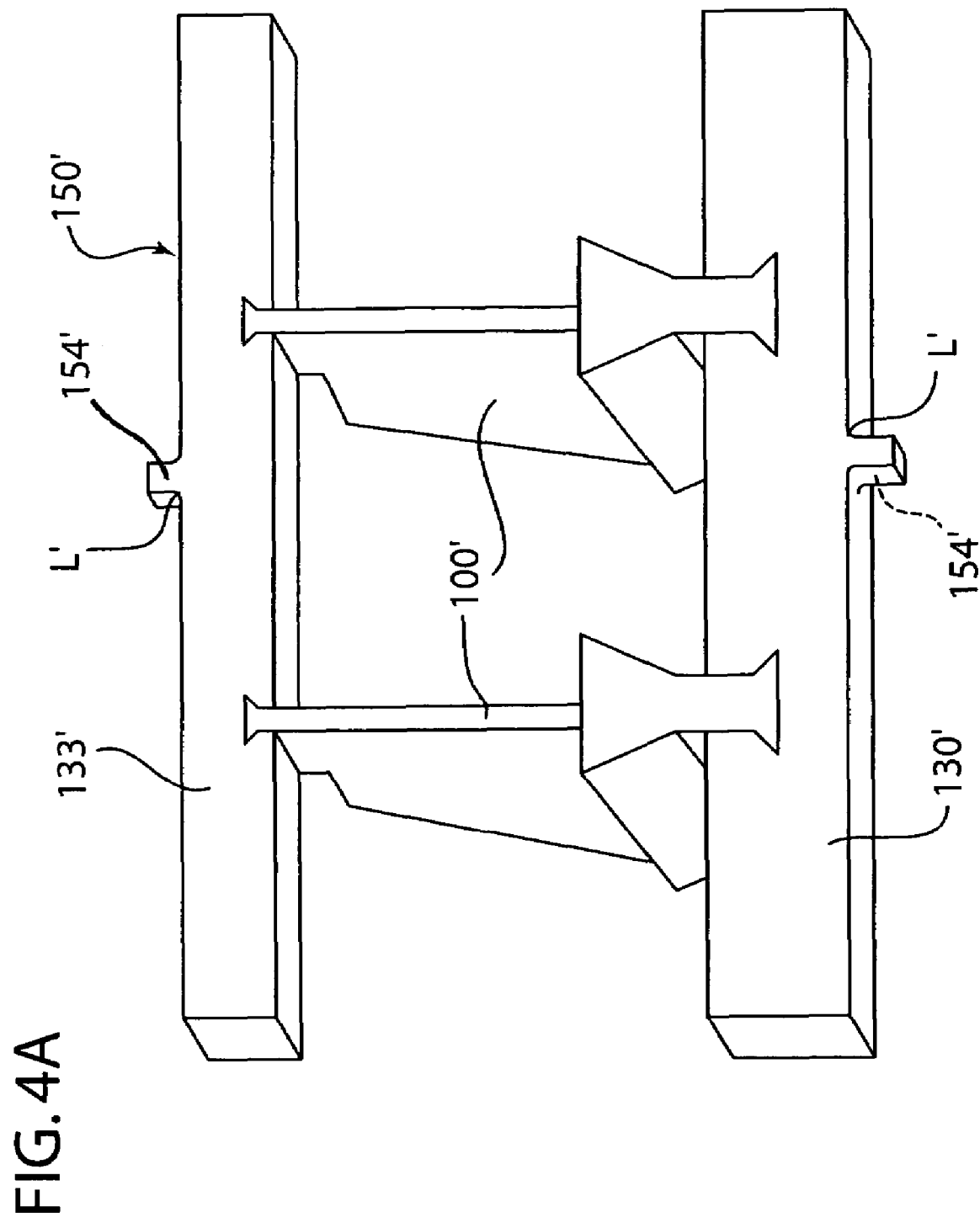
FIG. 4A is an elevational view of the pattern assembly produced using the gating die of FIG. 4.

In practicing still another method aspect of the invention illustrated in FIG. 4, preformed fugitive patterns 100' of an article to be cast are placed in the injection die 200' and the fluid gating material, such as molten wax, is injected from source 125' into the gating cavities 122', 123' via the runner passages 124' to form in-situ in the die 200' the gating 130', 133' interconnecting the fugitive patterns 100' in side-by-side relation, FIG. 4A. In particular, the root regions 111' of the patterns 100' are interconnected by gating 130', while the tip regions 113' of the patterns 100' are interconnected by the gating 133'.

Pursuant to this aspect of the invention, the preformed patterns 100' are shown positioned in a gating die 200' in order for gating 130' to be formed in-situ between root extensions 115r' and gating 133' to be formed between the tip extensions 115t' of the side-by-side patterns. A lower half 200a' of the gating die 120' is shown in FIG. 4. The upper half of the gating die 200' typically includes similar complementary die features (e.g. cavities 121', 122', 123' and runner passage 124') that mate or cooperate with those described below.

For example, the gating die half 200a' includes portions of pattern-receiving cavity 121' that is configured to receive the patterns 100'. The cavity 121' includes a root extension-receiving cavity 121a' adapted to receive the primary extensions 115r' of the root regions 111' of each pattern and a tip extension-receiving cavity 121c' adapted to receive the primary extensions 115t' of the tip regions 113' of each pattern. The cavity 121' also includes a cavity 121b' adapted to receive the root region 111', airfoil region 112', and tip region 113' of the pattern 100' with clearance. The primary root and tip extensions 115r' and 115t' of each pattern 100' are received in close tolerance fit in the cavities 121a', 121c' so as to hold each pattern in desired position in the die and to position secondary root extension 115ra' in gating cavity 122' of the gating die 120' and secondary tip extension 115ta' in gating cavity 123' of the gating die 120'. The secondary root and tip extensions 115ra', 115ta' each has a mechanical joint-forming surface 115s', which is shown as a dovetail joint-forming surface in FIG. 4. As described above, the cavities 121b' can have any suitable shape as described above for cavity 21b.

The gating die half 200a' includes portions of injection runner passages 124' communicated to the gating cavity 122' and 123' through which fluid gating material, such as molten wax or other gating material, is introduced into the gating cavity 122' and 123' from a source 125' of the type described above.

In practicing a method aspect of the invention, the preformed fugitive patterns 100' of an article to be cast are placed in the injection die 200' and the fluid gating material, such as molten wax, is injected into the gating cavities 122', 123' via the runner passages 124' to form in-situ in the die 200' the gating 130', 133' interconnecting the fugitive patterns 100' in side-by-side relation, FIG. 4A. The gating 130', 133' is solidified about and between the extensions 115ra', 115ta' in a manner to mechanically lock each pattern 100' to the gating 130', 133' by virtue of the wax bonding and mechanical joint therebetween.

In this way, an embodiment of the invention can be practiced to make a pattern assembly 150', FIG. 4A, that comprises one or more preformed fugitive patterns 100' of an article to be cast and gating 130', 133' connected to and interconnecting the patterns 100' in side-by-side relation by injecting fluid gating material in the gating die to form the gating in-situ therein. The pattern assembly 150' of FIG. 4A is removed from the gating die and then is joined to a runner bar that connects other pattern assemblies 150' and a pour cup to provide a final pattern assembly for making a shell mold by the lost wax shell mold building process after the runner 154' (formed by solidified wax in runner passage 124') is removed from the pattern assembly 150' at location L'. It will be apparent that the patterns 100' can be joined at the root regions 111' or at the tip regions 113 by the respective gating 130', 133', rather than at both the root and tip regions 111', 113' as shown in FIG. 4.

Although certain detailed embodiments of the invention are disclosed herein, those skilled in the art will appreciate that the invention is not limited to these embodiments but only as set forth in the following claims.

We claim:

1. A method of making a fugitive pattern assembly, comprising forming a plurality of fugitive patterns of an article to be cast in a single crystal casting mold formed on the pattern assembly wherein each pattern comprises a first end and an opposite second end and a first side and an opposite second side between the first end and the opposite second end, preforming a separate fugitive member adapted to be incorporated in the single crystal casting mold formed on the pattern assembly, placing the patterns in an injection die with at least two fugitive patterns placed in pattern-receiving cavities of the injection die in end-to-end relation wherein the first end of one of the two patterns is adjacent the second end of the other one of the two patterns in a common first die gating cavity and placing the fugitive member in another cavity of the injection die with a second die gating cavity between said fugitive member and one of the fugitive patterns, and injecting fluid gating material into the die to form in-situ gating in said first diegating cavity connected to said at least two fugitive patterns and in said second die gating cavity connected to said fugitive member and said one of the fugitive patterns.

2. The method of claim 1 wherein the fugitive member has a shape of a crystal selector member.

3. The method of claim 1 wherein the fugitive member has a shape of a crystal starter member.

4. The method of claim 1 wherein the each pattern has an airfoil region with a root end region and a tip end region wherein the root end regions of adjacent patterns are interconnected by the gating.

5. The method of claim 1 wherein each pattern has an airfoil region with a root end region and a tip end region wherein the root end region of one pattern is interconnected to the tip end region of an adjacent pattern by the gating.

6. The method of claim 1 including forming an extension on each pattern such that the extension communicates to the first die gating cavity when the pattern is received in said pattern-receiving cavity.

7. The method of claim 6 wherein the extension includes a region having a mechanical joint-forming surface.

8. The method of claim 7 wherein the joint-forming surface comprises a dovetail joint-forming surface.

9. The method of claim 1 wherein the fluid gating material comprises wax.

* * * * *